Aug. 1, 1950 R. W. ERDLE 2,517,100
METHOD OF FORMING CERAMIC ARTICLES AND PRODUCING
DIFFERENT COLORS OR SHADES ALONG DIFFERENT
PORTIONS OF THE ARTICLE
Filed March 23, 1946
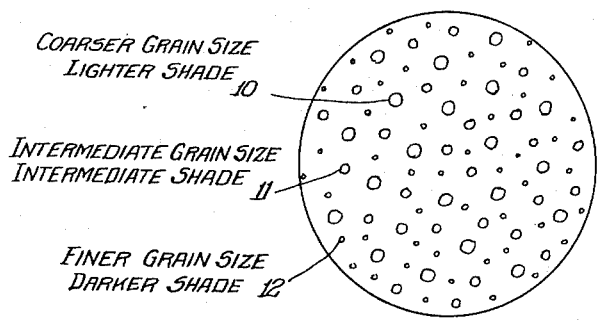
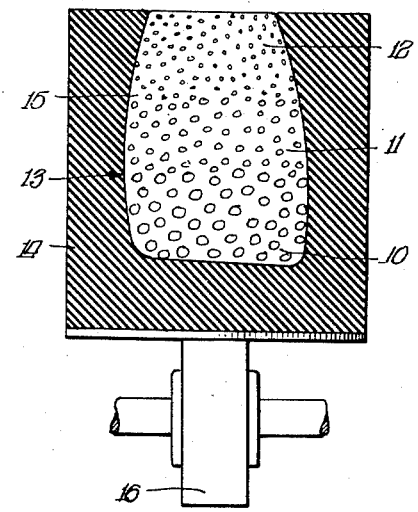
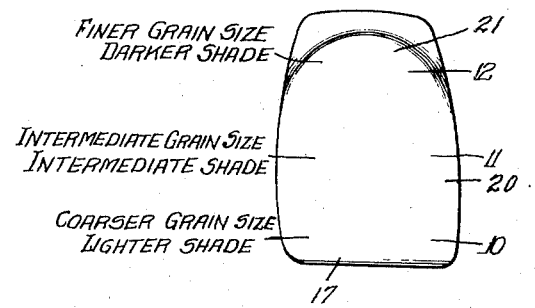
INVENTOR.
Reiner W. Erdle,
BY Patented Aug. 1, 1950

2,517,100

UNITED STATES PATENT OFFICE 2,517,100

METHOD OF FORMING CERAMIC ARTICLES AND PRODUCING DIFFERENT COLORS OR SHADES ALONG DIFFERENT PORTIONS OF THE ARTICLE

Reiner W. Erdle, Chicago, Ill., assignor to Dental Research Corporation, Chicago, Ill., a corporation of Illinois Application March 23, 1946, Serial No. 656,750

8 Claims. (Cl. 18—55.1)

This invention relates, in general, to a method of forming ceramic articles and producing different colors or shades along different portions of the article, and has particular relation to an improved method of forming artificial teeth and producing throughout the run of teeth different shades along different portions of the teeth accurately to match a standard shade guide or the natural teeth.

The present application is a division of my copending application Serial No. 525,012, filed March 4, 1944, now Patent No. 2,406,208, which relates to the article and the material for forming the same.

Heretofore, in order to produce different shades or colors in different parts of an artificial tooth, porcelains of different colors were manufactured.

Porcelain powders of different colors were mixed with distilled water or a suitable binder into separate porcelain mixes, one for each color. The lighter color porcelain mix, and a definite amount of it, was placed in the tooth cavity of the mold. By gravity or vibration, for example, in the manner set forth and claimed in my prior U. S. Patent No. 2,196,258, issued April 9, 1940, this porcelain mix would flow to the lower part of the mold cavity and form, for example, the incisal part of the tooth. The second color mix of porcelain having, for example, the color of the middle third or middle section of the tooth was then introduced into the mold cavity, and finally a third color porcelain mix having the color of the gingival part of the tooth was introduced into the mold cavity.

It was not always necessary to use three different colored porcelain mixes to produce a tooth having the desired shades along the different parts thereof. It was found that by carefully mixing the colored porcelain powders, two different colored porcelain mixes could be used to produce a porcelain tooth of a given shade.

In order to produce a given shade in a porcelain tooth with two or more different colored porcelains the operator must exercise extreme care to put the proper amount of the different colored porcelain mixes into the tooth mold. The time element is also of great importance. If too much time elapses between the operations of filling the mold with the different porcelain colors, a sharp line will appear on the tooth caused by the different colored porcelain mixes. If there is insufficient time between the filling operations, the porcelain colors will run together in the tooth mold and the porcelain tooth so produced will have substantially one color. This, of course, is undesirable.

In handling two or more porcelain mixes which have different colors, considerable time is consumed and the results depend upon the skill of the operator. Teeth are produced in this manner in different dental laboratories throughout the country and in other countries. They have to match a standard or given shade guide, and because the resulting shading of a tooth depends to a large extent on the skill of the operator it has been difficult to obtain reasonably accurate matches of manufactured teeth with a standard or given shade guide.

My copending application above identified discloses in its more specific aspects a unitary ground porcelain material comprising differentially ground particles of porcelain initially, and prior to grinding, of different colors and in which the differentially ground porcelain particles initially of different colors are combined in proportions adapted to produce by the different settling characteristics of the different size particles a predetermined shaded coloring effect in an article formed of the material; also as a new article of manufacture a porcelain tooth having an incisal portion formed of relatively coarsely ground porcelain particles initially, and prior to grinding, of relatively lighter color to produce the desired color along the incisal portion of the tooth, a gingival portion formed of relatively finer ground porcelain particles initially, and prior to grinding, of relatively darker color to produce a different color along the gingival portion of the tooth, and, if desired, an intermediate portion formed of relatively intermediate ground porcelain particles initially, and prior to grinding, of a relatively intermediate color to produce an intermediate color along the intermediate portion of the tooth.

According to the more specific aspects of the present invention, I produce the porcelain tooth or other ceramic article and the different shades or colors along different portions thereof by forming a unitary ground porcelain mix comprising differentially ground particles of porcelain initially and prior to grinding of different colors and in which the differentially ground porcelain particles, initially of different colors, are combined in proportions adapted to produce by the different settling characteristics of the different size particles a predetermined shaded coloring effect in an article formed of the material, filling the tooth cavity of the mold with this unitary porcelain mix, and vibrating the porcelain mix in the mold cavity to settle the coarser porcelain particles in the bottom of the mold cavity to produce the desired shade along the incisal portion of the tooth, with the finer porcelain particles of different shades settling above the coarser porcelain particles to produce a different shade along the gingival portion of the tooth, and, if desired, with intermediate porcelain particles of different shade settling intermediate the coarser and finer particles to produce a different shade along the intermediate portion of the tooth.

One of the main advantages of the present invention is the ability to overcome the difficulties above set forth and other difficulties previously encountered in the production of porcelain teeth and other ceramic articles.

Another advantage of the invention is in the ability to provide for automatically shading a tooth correctly, thereby raising the standard of the teeth.

Another advantage of the invention is the ability to provide for producing a tooth with its different parts of different shades from a single or unitary porcelain mix, thereby reducing the labor cost and eliminating any error an operator may make in handling two or more different colored porcelain mixes to fill the tooth mold cavity.

Another object of the invention is in the ability to avoid the necessity for separate differently colored porcelain mixes; also filling of the mold cavity by successive operations with the disadvantages already described.

Another advantage of the invention is in the ability to assure a better shading of the porcelain teeth, and that the different shades in different parts of each tooth of a commercial run of teeth will uniformly and accurately match a standard or given shade guide.

Further advantages of the invention will be apparent from the following detailed description taken in connection with the accompanying drawing.

In the drawing:

Figure 1 is a microenlargement showing a typical section of a porcelain powder embodying the present invention;

Figure 2 shows more or less diagrammatically a mold having a tooth cavity filled with the single or unitary porcelain mix of the present invention; and Figure 3 is an enlarged perspective view of a tooth formed according to the present invention.

Referring to the more or less diagrammatic illustrations in the drawing, I provide according to the present invention a unitary ground porcelain comprising differentially ground particles of porcelain initially, and prior to grinding, of different colors and in which the differentially ground porcelain particles initially of different colors are combined in proportions adapted to produce by the different settling characteristics of the different size particles a predetermined shaded coloring effect in an article formed of the material.

As shown diagrammatically in Figure 1, this new and improved porcelain has relatively coarse porcelain particles 10 made of a lighter shade porcelain having, for example, the color of the incisal part of the tooth. It also has finer porcelain particles 11, and still finer porcelain particles 12. The particles 11, which are of a grain size next smaller than the grain size of the particles 10, are made of a darker shade having the color of the middle part of the tooth. The particles 12 of next smaller grain size are made of a still darker shade, having the color of the gingival part of the tooth.

The particles 10, 11 and 12 of different colors or shades and different grain sizes, and in predetermined amounts, are mixed together to produce a single porcelain powder having all of the colors or shades required in a porcelain tooth. The single porcelain mix is produced by thoroughly mixing this mixture of porcelain particles 10, 11 and 12 with a definite amount of distilled water or a suitable binder to produce a single porcelain mix of the desired consistency and having all of the required colors of shades in the single porcelain mix.

The tooth cavity 13 of the mold is then filled with this single or unitary ground porcelain mix as shown at 15, thus introducing all of the representative lots of porcelain particles 10, 11 and 12 into the cavity 13 completely to fill the same in a single operation and without successively introducing porcelain mixes of different colors into different parts of the mold cavity as heretofore required. The porcelain mix 15 is preferably introduced into the mold cavity 13 while all of the various porcelain particles 10, 11 and 12 are in complete suspension in the water or binder. This assures the desired shading of the tooth, and also assures that the different shades in different parts of each tooth of a commercial run of teeth will accurately and uniformly match, for example, a standard or given shade guide.

All of the porcelain particles 10, 11 and 12 of different colors and different grain sizes may be kept in complete suspension during introduction of the single porcelain mix into the mold cavity 13 and up to that time, for example, by the method and means disclosed and claimed in my copending application Serial No. 522,706, filed February 17, 1944, now Patent No. 2,450,885 or in any other suitable manner.

The mold 14 may be a flexible mold of the character described and claimed in my prior U. S. Patent No. 2,337,036, issued December 21, 1943, although of course this may vary within the scope of the present invention.

Upon filling the mold cavity 13 with the single porcelain mix, the mold 14 and porcelain mix 15 in the cavity 13 thereof are vibrated, for example, as more fully described and claimed in my prior U. S. Patent No. 2,196,258, issued April 9, 1940. Vibrating means for this purpose is shown more or less diagrammatically at 16. The particular manner in which the desired vibration is secured and the particular form of the vibrating means may of course vary widely.

The different size porcelain particles 10, 11, and 12 have different settling characteristics. The particles 10, which are coarser or of larger grain size, will settle at once to the bottom of the mold cavity 13. The next finer particles 11 settle over the coarser particles 10, and where particles 12 of a third grain size are employed these still finer particles 12 settle over the particles 11 of intermediate grain size. In this manner the correctly colored porcelain particles pack into the proper parts of the mold cavity 13 to produce, by the different settling or packing characteristics of the different size particles, the different colors or shades in the different parts of the tooth. The finer particles will fill in the spaces between the coarser particles to produce an accurate and uniform overall blending of colors, so that the resulting tooth will follow the shade of natural teeth.

After the tooth as shown at 17 in Figure 3 is removed from the mold 14, it may be dried and fire-hardened and glazed, as more fully disclosed in my previously mentioned U. S. Patent No.

2,196,258. The porcelain tooth 17 selected for illustration is an anterior tooth, but of course this may vary. The incisal part 19 of the tooth 17 is formed by the coarser grain particles 10 having the color of the incisal shade of the tooth. The middle part 20 of the tooth is formed by the next finer particles 11 having the color of the middle part of the tooth. The gingival part 21 is formed by the next finer particles 12 having the color of the gingival part of the tooth.

From the foregoing description it will now be apparent that the use of the single or unitary mix porcelain and forming of the tooth by the present invention have the advantage of automatically shading a tooth correctly, thereby raising the standard of teeth produced according to the present invention. The filling of the tooth mold cavity 13 involves the handling of only one porcelain mix, which reduces considerably the labor cost for producing porcelain teeth. The use of the single or unitary mix porcelain also eliminates any error an operator can make by handling two or more different colored porcelains to fill a tooth mold cavity by successive filling operations. As a result, I secure better shading or coloring of the tooth, and I assure uniform and accurate matching of all teeth of a given commercial run of teeth with a standard or given shade guide.

If desired, some of the porcelain particles 10 may be uncolored and other of such particles 10 may be colored to shade the incisal part of the tooth by a blanding of the colored and uncolored poreclain. Likewise some of the porcelain particles 11 and/or some of the particles 12 may be uncolored and other of such particles may be colored to shade the tooth along its middle and gingival parts by a blending of these colored and uncolored porcelain particles.

One suitable porcelain for purposes of the present invention is composed of minerals and, mainly, of nepheline syenite, as more fully described in my prior U. S. Patent No. 2,334,319, issued November 16, 1943. This particular material is referred to for purposes of illustration, it being understood that other ceramic materials and like materials may be employed within the scope of the broader aspects of the present invention.

The embodiment of the invention shown in the drawings is for illustrative purposes only, and it is to be expressly understood that the drawing and the accompanying specification are not to be construed as a definition of the limits or scope of the invention, reference being had to the appended claims for that purpose.

I claim:

1. The method of forming an article of comminuted material and producing different shades along different portions thereof, which comprises applying different colors to different batches of the material prior to reducing same to comminuted form, reducing the different batches of differently colored materials to comminuted form with the particles of the different batches of different grain sizes, combining the differently colored particles of different grain sizes together and with a liquid to form a unitary mix, introducing said mix into the cavity of a mold, and imposing a vibrating action upon the unitary mix in the mold cavity to settle the coarser particles beneath the finer particles, whereby to produce different shades along different portions of the article and to compact the material to the form of a firm body of a shape corresponding to the shape of the mold cavity.

2. The method of forming porcelain teeth of comminuted porcelain material and producing different shades along different portions of the teeth, which comprises applying different colors to different batches of the porcelain material prior to reducing same to comminuted form, reducing the different batches of differently colored porcelain material to comminuted form with the particles of the different batches of different grain sizes, combining the differently colored particles of different grain sizes together and with a liquid to form a unitary porcelain mix, introducing said mix into the tooth cavity of a mold, and imposing a vibrating action upon the unitary mix in the mold cavity to settle the coarser particles beneath the finer particles, whereby to produce different shades along different portions of the tooth and to compact the material to the form of a firm body of a shape corresponding to the shape of the tooth cavity of the mold.

3. The method of forming porcelain teeth of comminuted porcelain material and producing different shades along different portions of the teeth, which comprises applying different colors to at least three different batches of porcelain material prior to reducing same to comminuted form, reducing the different batches of differently colored porcelain material to comminuted form with the particles of the three different batches of relatively fine, intermediate, and relatively coarse grain sizes respectively, combining the differently colored particles of relatively fine, intermediate, and relatively coarse grain sizes together and with a liquid to form a unitary porcelain mix, introducing said mix into the tooth cavity of a mold, and imposing a vibrating action upon the unitary mix in the mold cavity to settle the relatively coarse particles at the bottom, the particles of intermediate grain size above said relatively coarse particles, and the relatively fine particles above said particles of intermediate grain size, whereby to produce different shades along different portions of the tooth and to compact the material to the form of a firm body of a shape corresponding to the shape of the tooth cavity of the mold.

4. The method of forming an article of comminuted material and producing different shades along different portions thereof, which comprises combining a plurality of batches of comminuted material with the particles of different batches of different grain sizes and of different colors and with a liquid to form a unitary mix, introducing said mix into the cavity of a mold, and imposing a vibrating action upon the unitary mix in the mold cavity to settle the coarser particles beneath the finer particles whereby to produce different shades along different portions of the article and to compact the material to the form of a firm body of a shape corresponding to the shape of the mold cavity.

5. The method of forming porcelain teeth of comminuted porcelain material and producing different shades along different portions of the teeth, which comprises combining a plurality of batches of comminuted porcelain material with the particles of different batches of different grain sizes and of different colors and with a liquid to form a unitary mix, introducing said mix into the tooth cavity of a mold, and imposing a vibrating action upon the unitary mix in the mold cavity to settle the coarser particles beneath the finer particles whereby to produce different shades along different portions of the tooth and to compact the material to the form of a firm body of a shape corresponding to the shape of the tooth cavity of the mold.

6. The method of forming porcelain teeth of comminuted porcelain material and producing different shades along different portions of the teeth, which comprises combining at least three different batches of comminuted porcelain material with the particles of the batches of relatively fine, intermediate, and relatively coarse grain sizes and of different colors respectively, and with a liquid to form a unitary porcelain mix, introducing said mix into the tooth cavity of a mold, and imposing a vibrating action upon the unitary mix in the mold cavity to settle the relatively coarse particles at the bottom, the particles of intermediate grain size above said relatively coarse particles, and the relatively fine particles above said particles of intermediate grain size, whereby to produce different shades along different portions of the tooth and to compact the material to the form of a firm body of a shape corresponding to the shape of the tooth cavity of the mold.

7. The method of forming a comminuted mix of material for producing articles with different colors along different portions thereof, which comprises mixing first particles of substantially one grain size and of substantially one color with second particles of another grain size and of a different color and proportioning said first and second particles in said mix in proportions adapted when mixed with a liquid to produce by the different settling characteristics of said first and second particles when a vibrating action is imposed upon the mix a predetermined coloring effect in an article formed of said mix.

8. The method according to claim 7 wherein the particles of different sizes are formed by grinding different batches of material to different particle sizes, and wherein the different colors are applied to the different batches of material prior to grinding the same.

REINER W. ERDLE.

REFERENCES CITED

The following references are of record in the file of this patent:

UNITED STATES PATENTS

| Number | Name | Date |
|---|---|---|
| Re. 18,626 | White | Oct. 18, 1932 |
| 2,165,466 | Erdle | July 11, 1939 |
| 2,196,258 | Erdle | Apr. 9, 1940 |